United States Patent
Richter et al.

(10) Patent No.: US 12,530,836 B2
(45) Date of Patent: Jan. 20, 2026

(54) OBJECT TRANSITION BETWEEN DEVICE-WORLD-LOCKED AND PHYSICAL-WORLD-LOCKED

(71) Applicant: SpaceCraft, Inc., Beverly Hills, CA (US)

(72) Inventors: Ian M. Richter, Los Angeles, CA (US); Alexis R. Haraux, Seattle, WA (US)

(73) Assignee: SpaceCraft, Inc., Beverly Hills, CA (US)

( * ) Notice: Subject to any disclaimer, the term of this patent is extended or adjusted under 35 U.S.C. 154(b) by 243 days.

(21) Appl. No.: 18/207,296

(22) Filed: Jun. 8, 2023

(65) Prior Publication Data

US 2023/0410415 A1  Dec. 21, 2023

Related U.S. Application Data

(60) Provisional application No. 63/351,194, filed on Jun. 10, 2022.

(51) Int. Cl.
G06T 15/20 (2011.01)
G06T 19/00 (2011.01)

(52) U.S. Cl.
CPC ............ G06T 15/20 (2013.01); G06T 19/006 (2013.01)

(58) Field of Classification Search
CPC ........ G06T 15/20; G06T 19/006; G06F 3/011
See application file for complete search history.

(56) References Cited

U.S. PATENT DOCUMENTS

| 9,230,368 B2 | 1/2016 | Keane et al. |
| 9,767,609 B2 | 9/2017 | Eade et al. |
| 2015/0317831 A1* | 11/2015 | Ebstyne ................. G06F 3/011 345/419 |

FOREIGN PATENT DOCUMENTS

WO  2015161307 A1  10/2015

OTHER PUBLICATIONS

Emilee Patrick et al., "Using a Large Projection Screen as an Alternative to Head-Mounted Displays for Virtual Environments," In Proceedings of the SIGCHI conference on Human Factors in Computing Systems (pp. 478-485).

* cited by examiner

Primary Examiner — Xiao M Wu
Assistant Examiner — Ryan Allen Barham
(74) Attorney, Agent, or Firm — Fernando & Partners, LLP

(57) ABSTRACT

In one implementation, a method of displaying a virtual object is performed at a device in a physical environment, the device having a display, one or more processors, and non-transitory memory. The method includes displaying, on the display, a virtual object as a device-world-locked virtual object in a three-dimensional virtual portion of a mixed reality environment. The method includes detecting a device-world-to-physical-world transition trigger. The method includes, in response to detecting the device-world-to-physical-world transition trigger, displaying the virtual object as a physical-world-locked virtual object in a three-dimensional real portion of the mixed reality environment corresponding to at least a portion of the physical environment.

20 Claims, 16 Drawing Sheets

OBJECT TRANSITION BETWEEN DEVICE-WORLD-LOCKED AND PHYSICAL-WORLD-LOCKED

CROSS-REFERENCE TO RELATED APPLICATIONS

This application claims priority to U.S. Provisional Patent App. No. 63/351,194, filed on Jun. 10, 2022, which is hereby incorporated by reference in its entirety.

TECHNICAL FIELD

The present disclosure generally relates to displaying virtual objects in different reference frames.

BACKGROUND

In various implementations, a virtual object can be displayed by an electronic device in a mixed reality environment as a display-locked object or a world-locked object. As a display-locked object, the location on the display of the virtual object does not change in response to movement of the electronic device in the physical environment. As a world-locked object, the location on the display of the virtual object changes in response to movement of the electronic device such that the virtual object appears to maintain its location in the physical environment.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
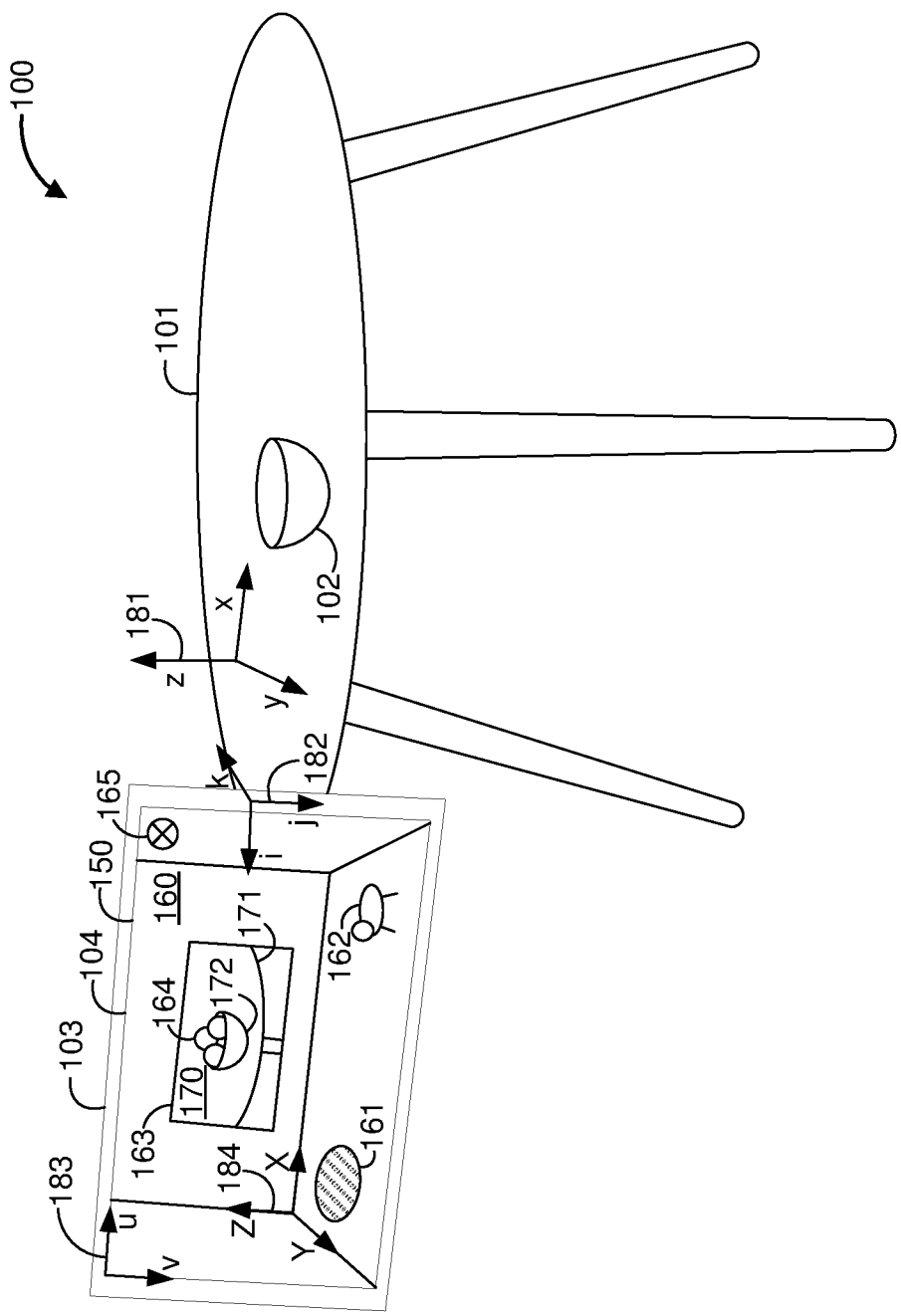
FIGS. 1A-1N illustrates a physical environment at a series of times.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for displaying virtual objects. In various implementations, the method is performed at a device in a physical environment, the device having a display, one or more processors, and non-transitory memory. The method includes displaying, on the display, a virtual object as a device-world-locked virtual object in a three-dimensional virtual portion of a mixed reality environment. The method includes detecting a device-world-to-physical-world transition trigger. The method includes, in response to detecting the device-world-to-physical-world transition trigger, displaying the virtual object as a physical-world-locked virtual object in a three-dimensional real portion of the mixed reality environment corresponding to at least a portion of the physical environment.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

As noted above, in various implementations, a virtual object can be displayed by an electronic device in a mixed reality environment within various reference frames, such as a display reference frame, a world reference frame, or a body reference frame. As described further below, in various implementations, a virtual object is displayed in a three-dimensional device-world reference frame.

Figure 1B:
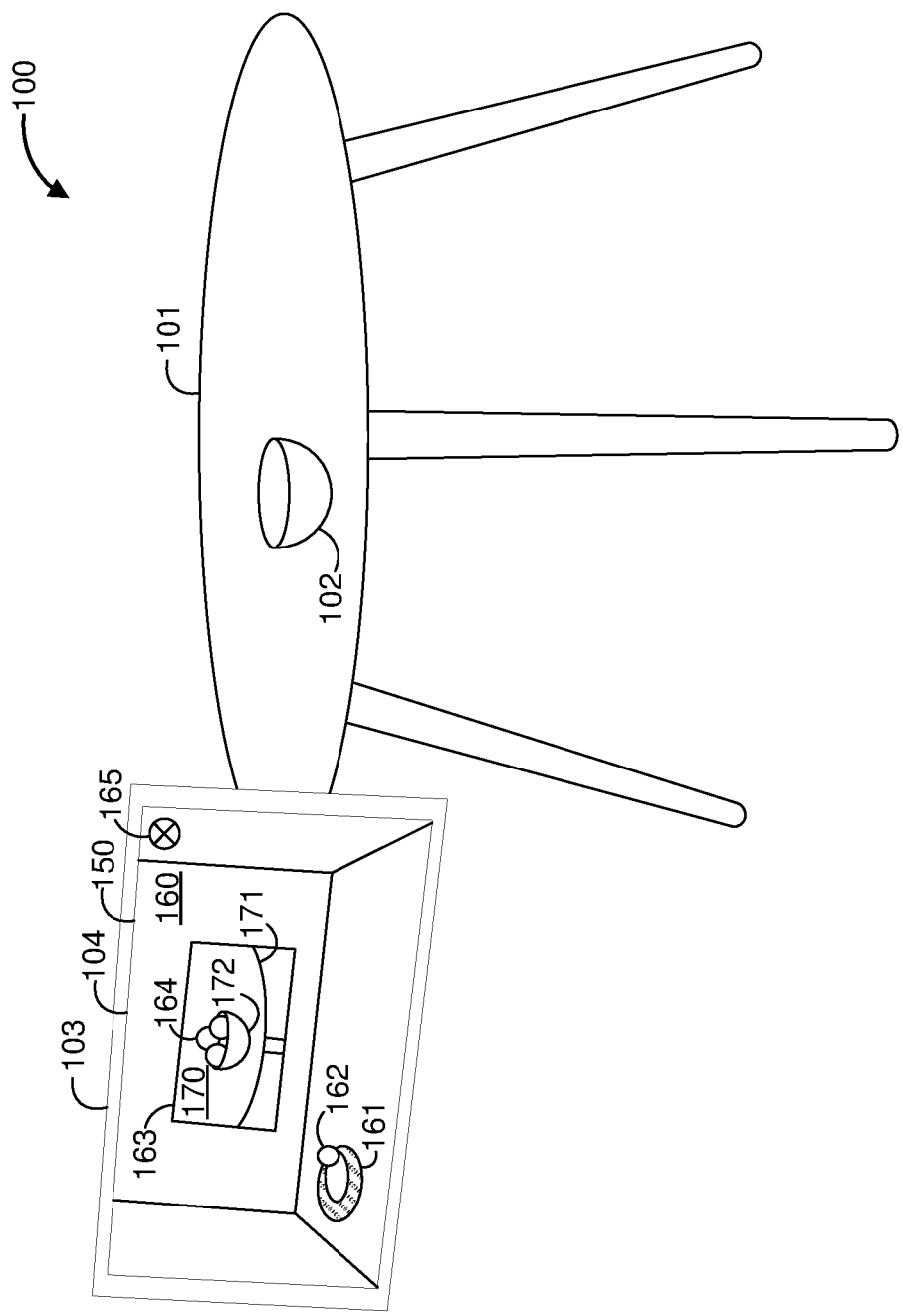
Figure 1C:
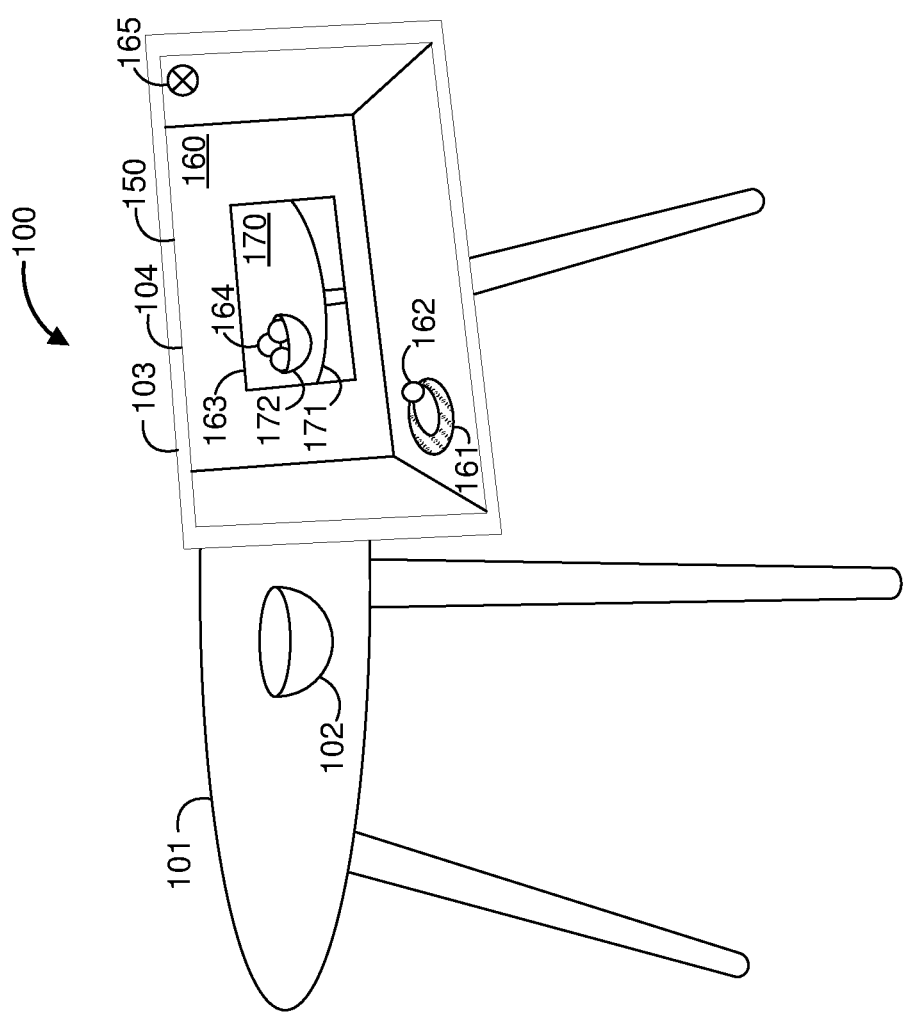
Figure 1D:
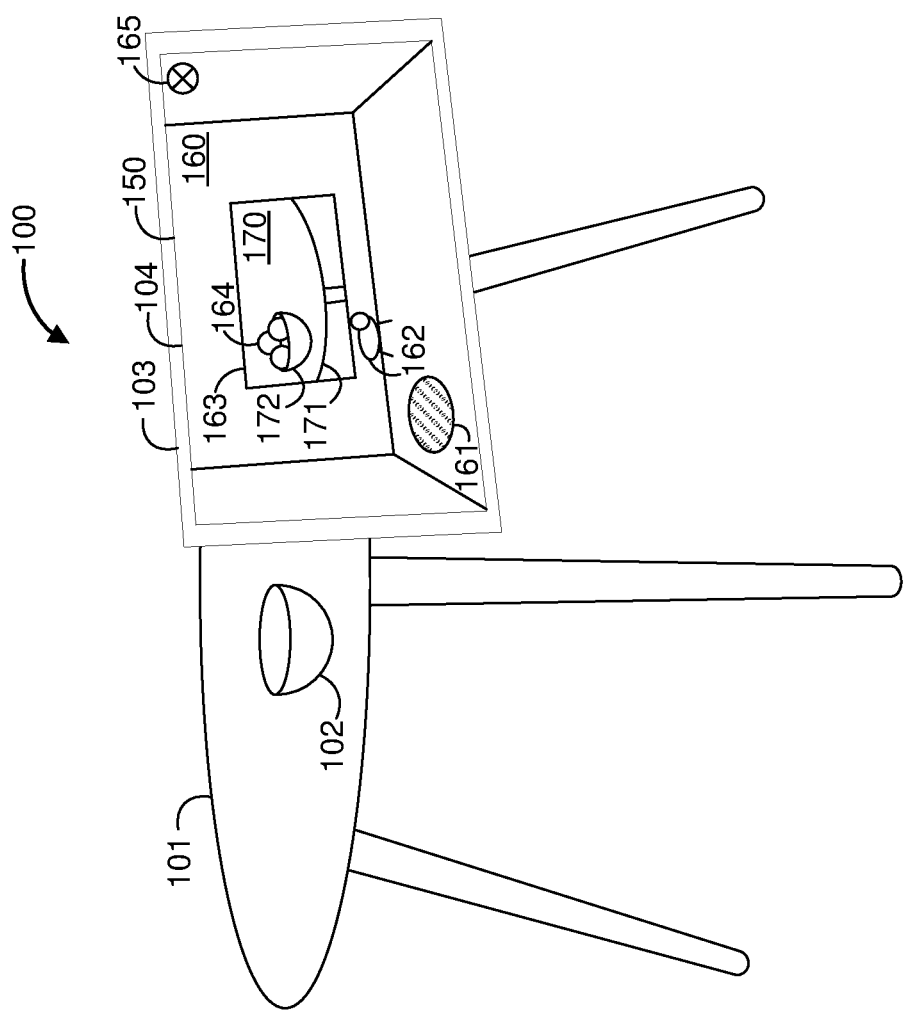
Figure 1E:
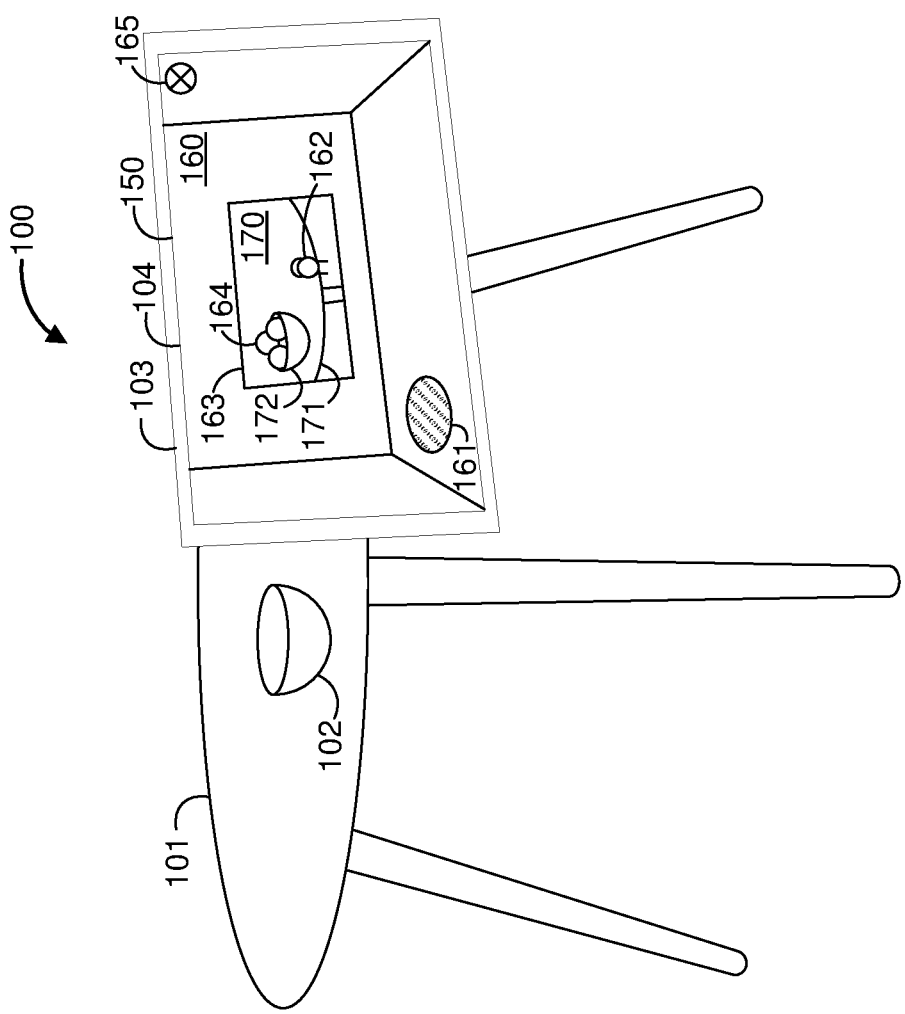
Figure 1F:
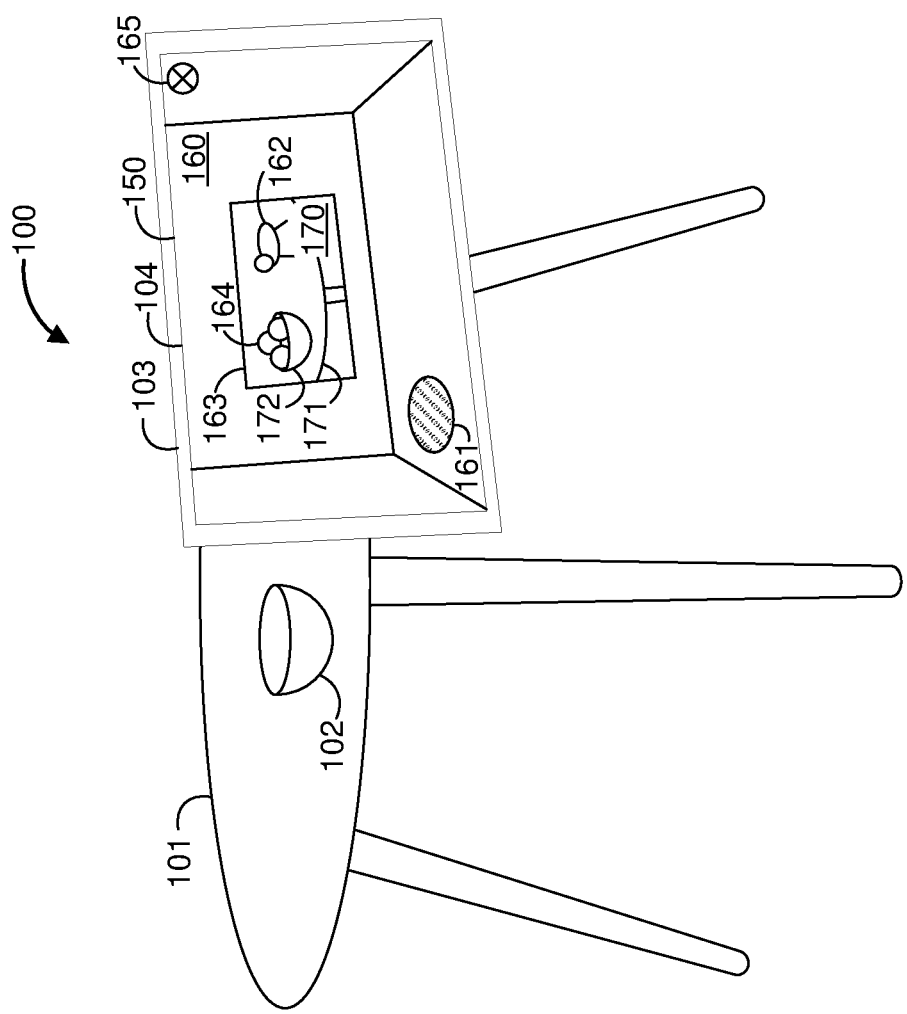
Figure 1G:
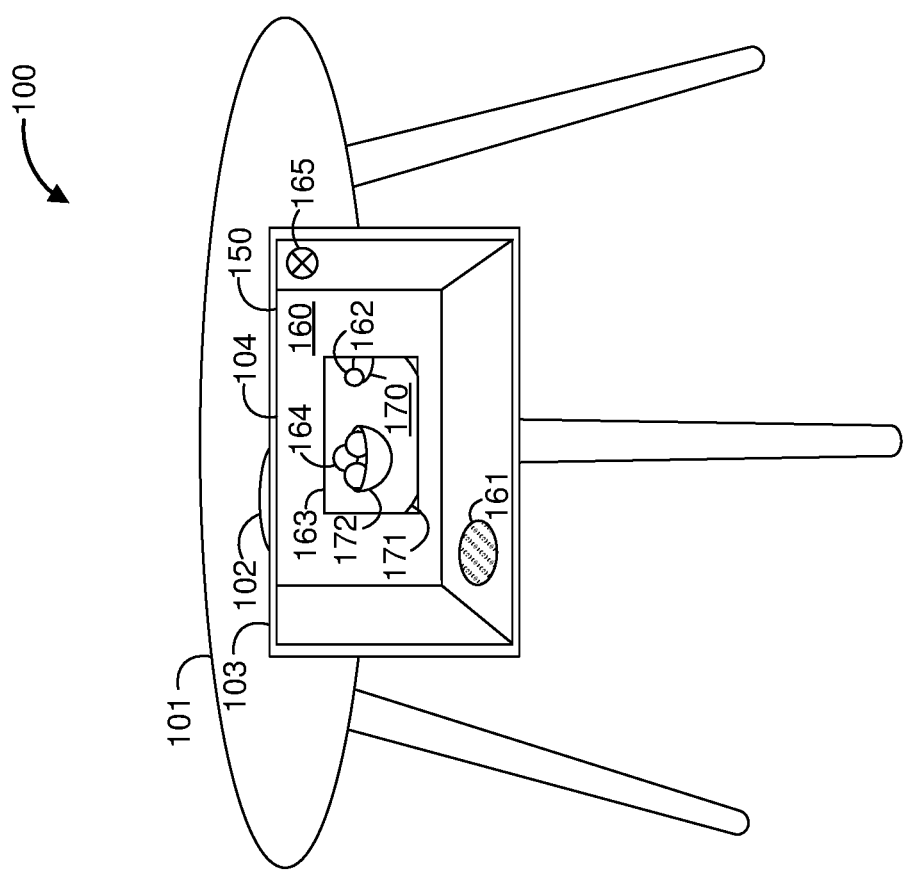
Figure 1H:
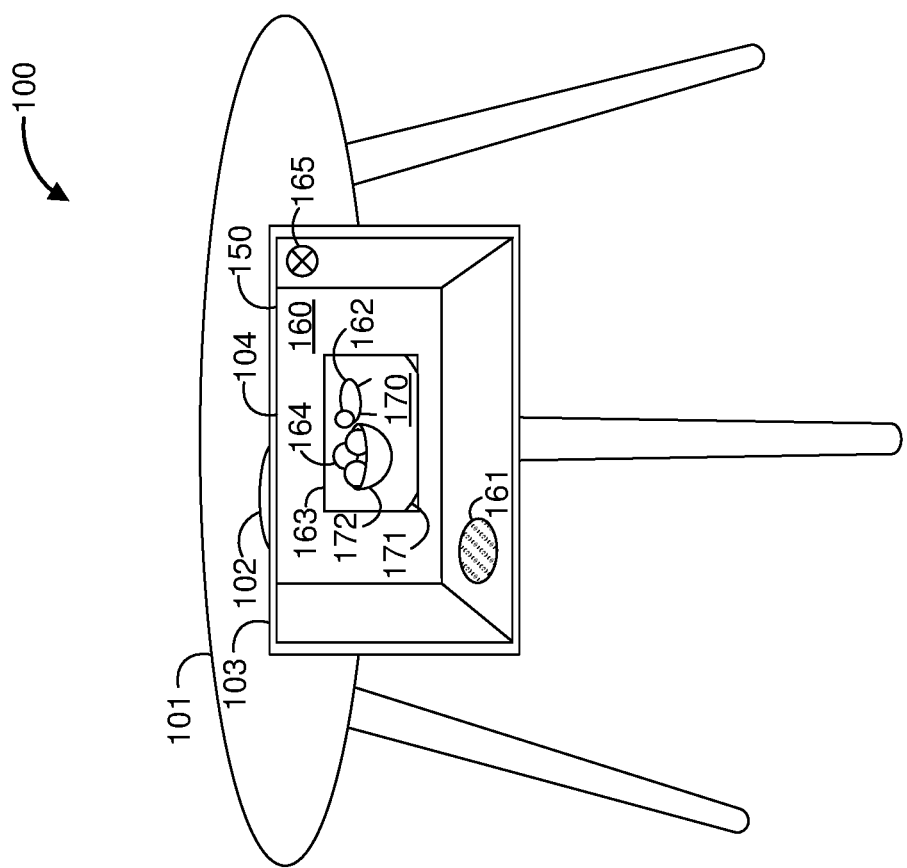
Figure 1I:
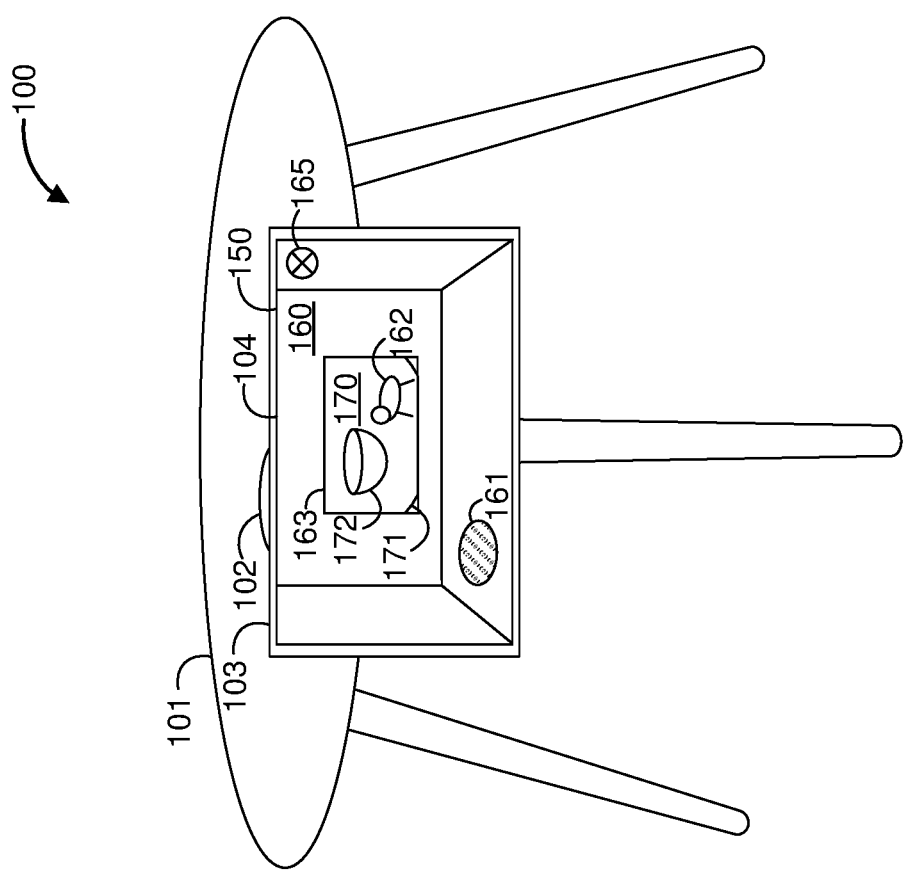
Figure 1J:
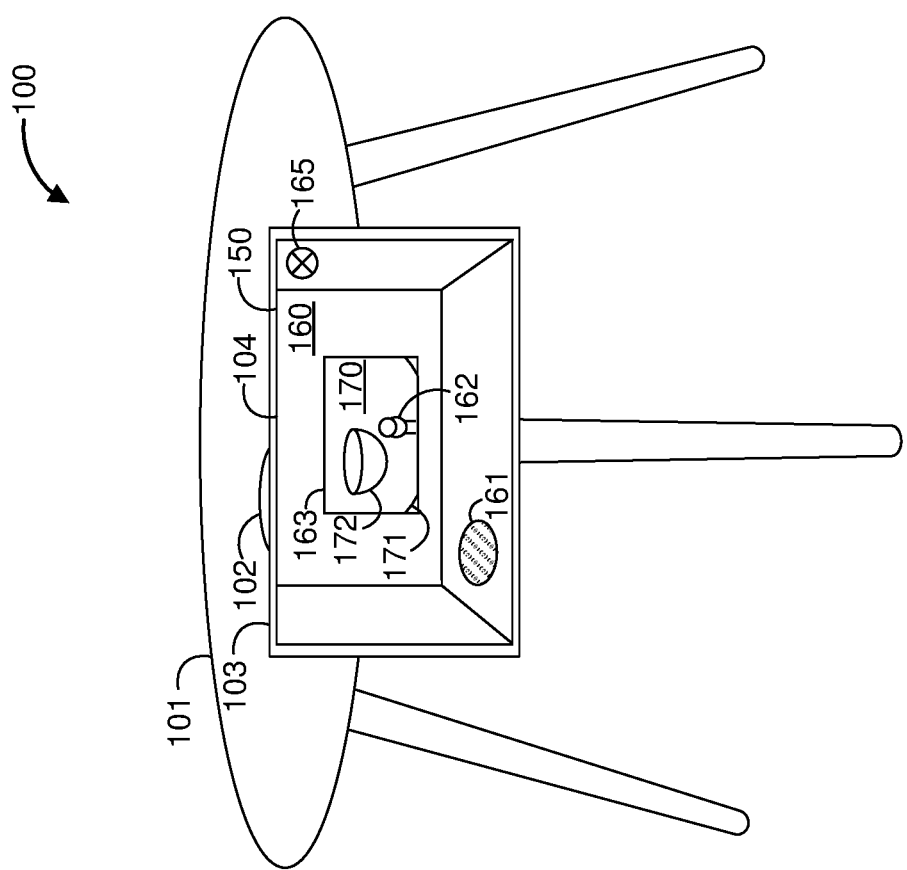
Figure 1K:
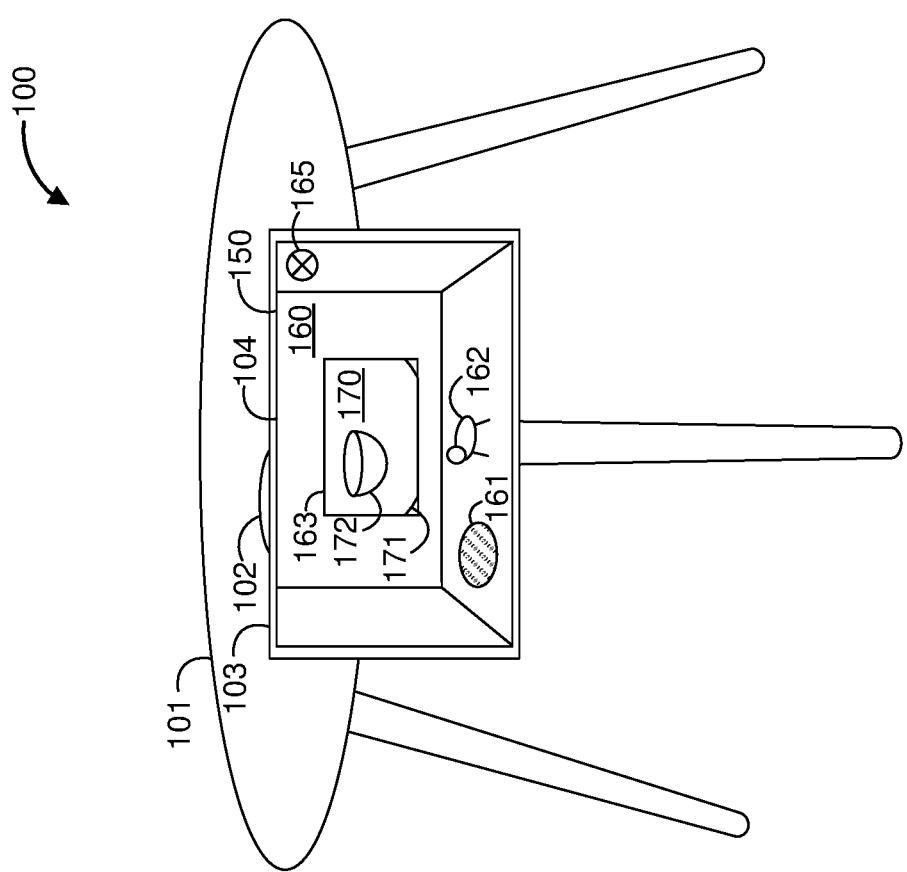
Figure 1L:
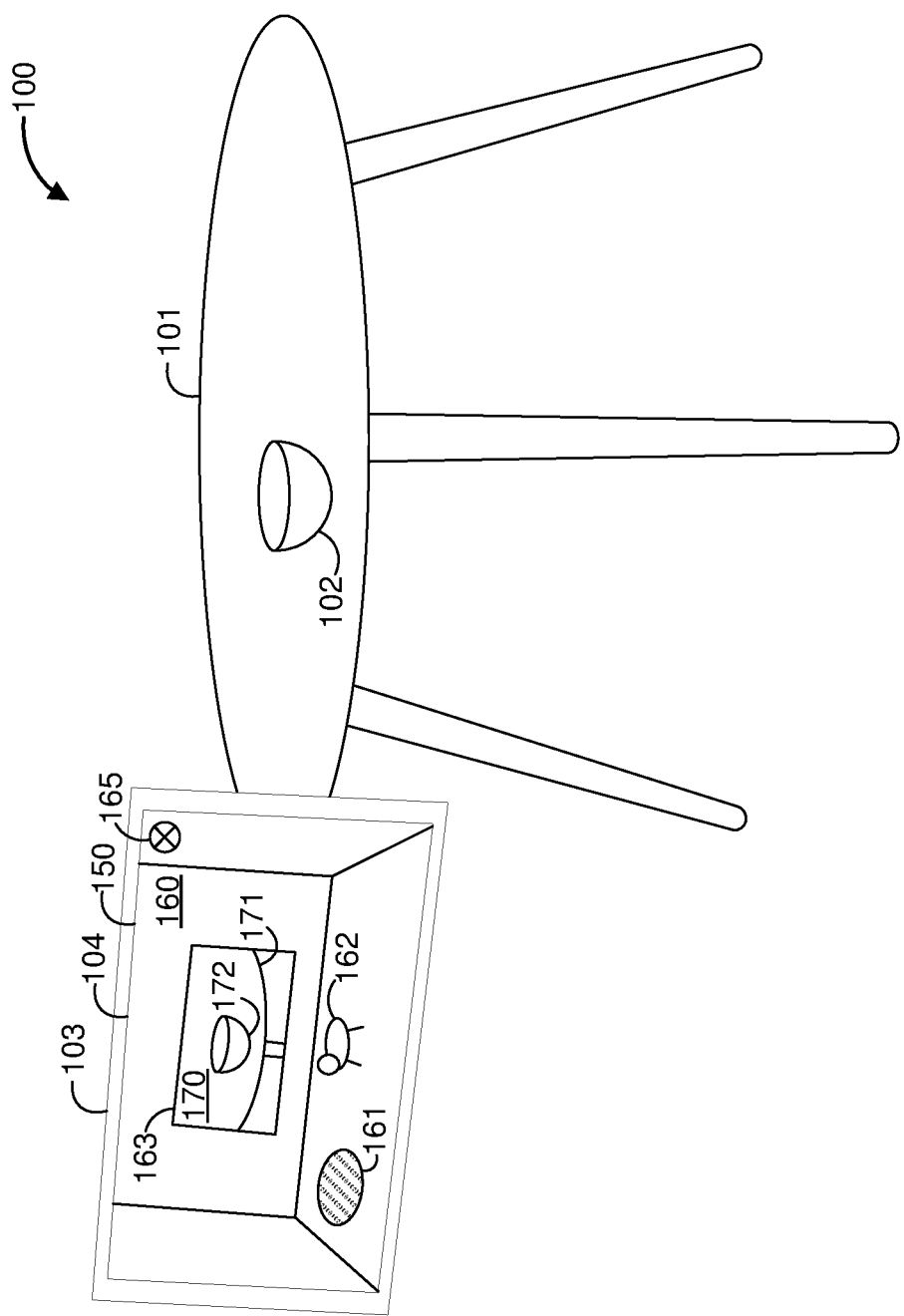
Figure 1M:
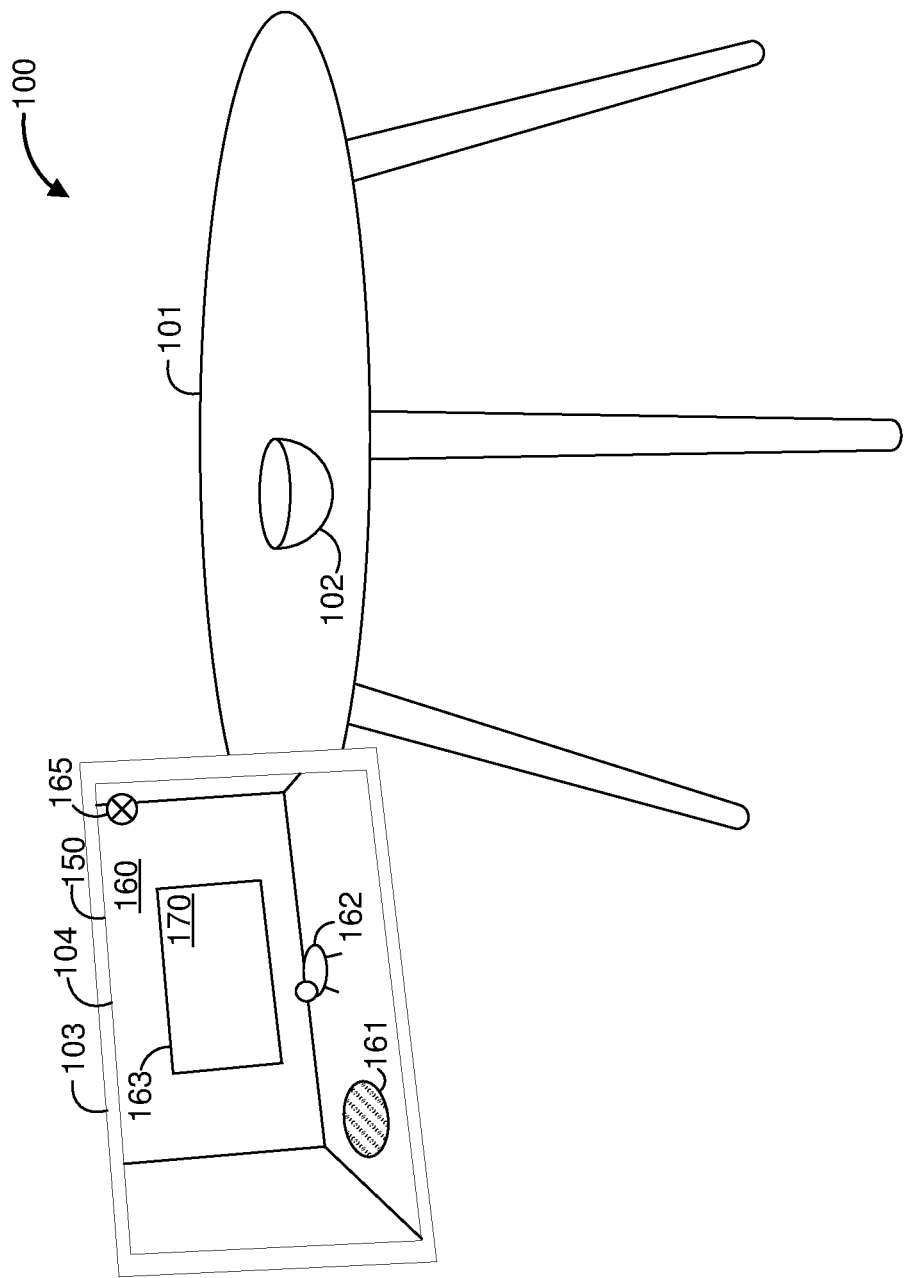
Figure 1N:
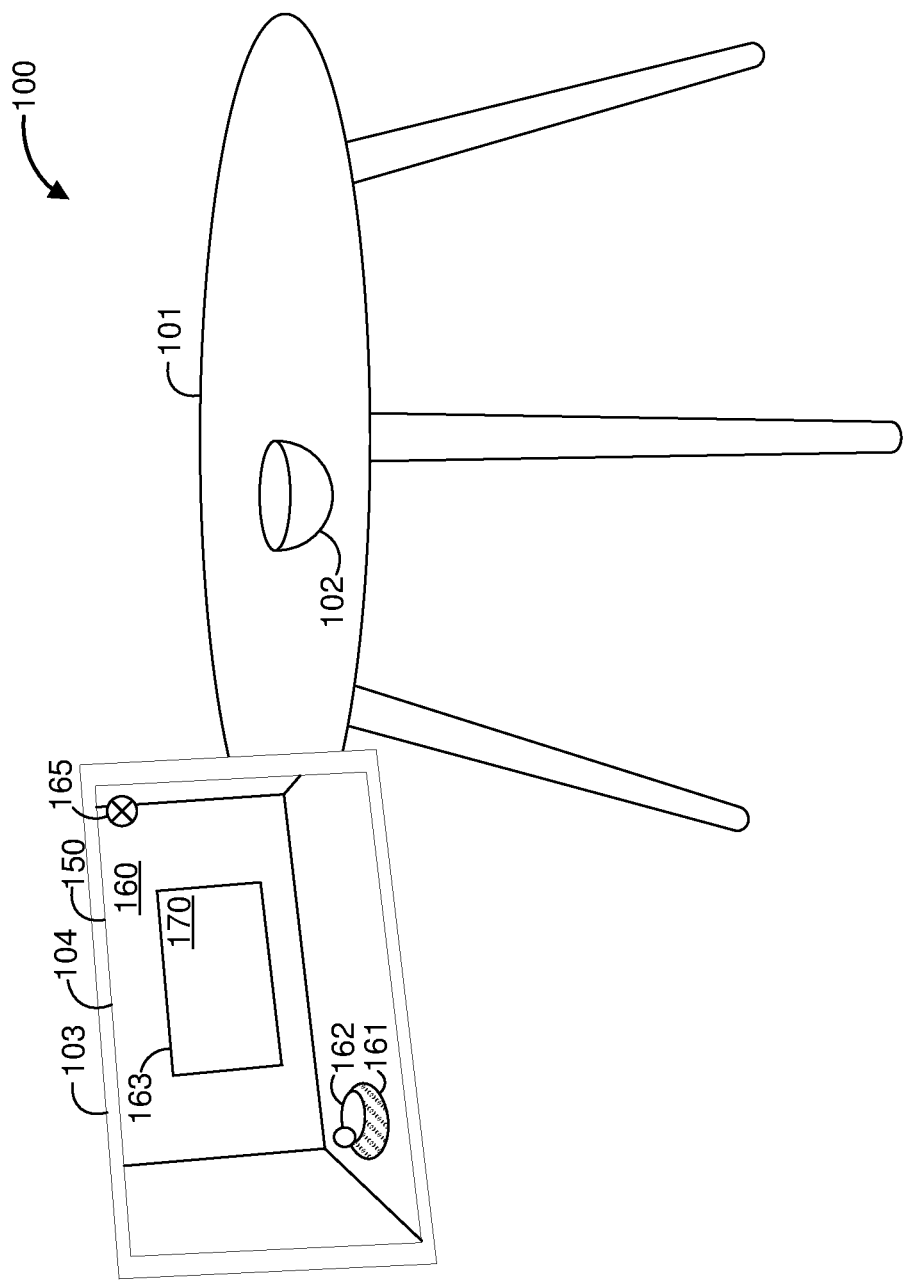

FIGS. 1A-1N illustrate a physical environment 100 at a series of times. The physical environment 100 includes a physical table 101 and a physical bowl 102 sitting atop the physical table 101. The physical environment includes a physical electronic device 103 (hereinafter "device 103") including a display 104 via which the device 103 displays a mixed reality (MR) environment 150.

The MR environment 150 includes a virtual room 160 including a virtual rug 161 and a virtual cat 162. The MR environment 150 includes a virtual close button 165 which, when selected by a user, causes the device 103 to cease displaying the MR environment 150.

The virtual room 160 has a virtual window 163 through which the device 103 displays a physical environment representation 170 of a portion of the physical environment 100. The physical environment representation 170 includes a table representation 171 of the physical table 101 and a bowl representation 172 of the physical bowl 102. In various implementations, the device 103 includes a camera directed towards a portion of the physical environment 100 and the physical environment representation 170 displays at least a portion of an image captured by the camera. In various implementations, the portion of the image is augmented with virtual content. For example, in FIG. 1A, the physical environment representation 170 includes virtual ice cream 164 displayed in the bowl representation 172.

The physical environment 100 is associated with a three-dimensional physical-world coordinate system (represented by the axes 181) in which a point in the physical-world coordinate system includes an x-coordinate, a y-coordinate, and a z-coordinate. The camera is associated with a three-dimensional camera coordinate system (represented by the axes 182) in which a point in the camera coordinate system includes an i-coordinate, a j-coordinate, and a k-coordinate. The k-axis of the camera coordinate system corresponding to the optical axis of the camera. The physical-world coordinate system and the camera coordinate system are related by a transform based on the pose (e.g., the three-dimensional location and three-dimensional orientation) of the camera (and the device 103) in the physical-world coordinate system. Thus, when the three-dimensional coordinates of a point in the physical-world coordinate system and the pose of the device 103 in the physical-world coordinate system are known, the three-dimensional coordinates of the point in the camera coordinate system can be determined.

Further, the display 104 of the device 103 is associated with a two-dimensional display coordinate system (represented by the axes 183) in which a point in the display coordinate system includes a u-coordinate and a v-coordinate. The camera coordinate system and the display coordinate system are related by a transform based on the intrinsic parameters of the camera. Thus, when the three-dimensional coordinates of a point in the camera coordinate system and the intrinsic parameters of the camera are known, the two-dimensional coordinates of the point in the display coordinate system can be determined.

The virtual room 160 is associated with a three-dimensional device-world coordinate system (represented by the axes 184) in which a point in the device-world coordinate system includes an X-coordinate, a Y-coordinate, and a Z-coordinate. The device-world coordinate system and the display coordinate system are related by a transform based on the pose of the perspective (sometimes referred to as the "virtual camera") in the device-world coordinate system, e.g., the location and orientation at which the virtual room 160 is being viewed. Thus, when the three-dimensional coordinates of a point in the device-world coordinate system and the pose of the perspective are known, the two-dimensional coordinates of the point in the display coordinate system can be determined.

In various implementations, the pose of the perspective is fixed. For example, in various implementations, the pose of the perspective is fixed at a location a perpendicular distance (e.g., eighteen inches) away from the center of the display 104, looking at the center of the display 104. In various implementations, the pose of the perspective is dynamic, e.g., based on a perspective of a user with respect to the device 103.

In various implementations, a representation of a physical object may be displayed at a location on the display 104 corresponding to the location of the physical object in the physical environment 100. For example, in FIG. 1A, the bowl representation 172 is displayed at a location on the display 104 corresponding to the location in the physical environment of the physical bowl 102. Similarly, a virtual object may be displayed at a location on the display 104 corresponding to a location in the physical environment 100. For example, in FIG. 1A, the virtual ice cream 164 is displayed at a location on the display 104 corresponding to a location in the physical environment 100 within the physical bowl 102. Because the location on the display is related to the location in the physical environment using a transform based on the pose of the device 103, as the device 103 moves in the physical environment 100, the location on the display 104 of the bowl representation 172 changes. Similarly, as the device 103 moves, the device 103 correspondingly changes the location on the display 104 of the virtual ice cream 164 such that it appears to maintain its location in the physical environment 100 within the physical bowl 102. A virtual object that, in response to movement of the device 103, changes location on the display 104 to maintain its appearance at the same location in the physical environment 100 may be referred to as a "world-locked" virtual object or a "physical-world-locked" virtual object.

To render a physical-world-locked virtual object, the device 103 determines one or more sets of three-dimensional coordinates in the physical-world coordinate system for the virtual object (e.g., a set of three-dimensional coordinates in the physical-world coordinate system for each vertex of the virtual object). The device 103 transforms the one or more sets of three-dimensional coordinates in the physical-world coordinate system into one or more sets of three-dimensional coordinates in the camera coordinate system using a transform based on the pose of the device 103. The device transforms the one or more sets of three-dimensional coordinates in the camera coordinate system into one or more sets of two-dimensional coordinates in the display coordinate system using a transform based on the intrinsic parameters of the camera. Finally, the device 103 renders the virtual object on the display 104 using the two-dimensional coordinates in the display coordinate system.

A virtual object that, in response to movement of the device 103, maintains its location on the display 104 may be referred to as a "device-locked" virtual object or a "display-locked" virtual object. For example, in FIG. 1A, the virtual close button 165 is displayed at a location on the display 104 that does not change in response to movement of the device 103.

To render a display-locked virtual object, the device 103 determines one or more sets of two-dimensional coordinates in the display coordinate system for the virtual object (e.g., a set of two-dimensional coordinates in the display coordinate system for each vertex (or pixel) of the virtual object). Then, the device 103 renders the virtual object on the display 104 using the two-dimensional coordinates in the display coordinate system.

In various implementations, a virtual object may be displayed at a location on the display 104 corresponding to a location in the virtual room 160. For example, in FIG. 1A, the virtual rug 161 is displayed at a location on the display 104 corresponding to a location in the virtual room 160, e.g., on the floor of the virtual room 160. Whereas a virtual object that, in response to movement of the device 103, maintains its appearance at the same location in the physical environment 100 is referred to as a physical-world-locked object, a virtual object that, in response to movement of the device 103, maintains its appearance at the same location in the virtual room 160 may be referred to as a "room-locked" virtual object or a "device-world-locked" virtual object.

To render a device-world-locked virtual object, the device 103 determines one or more sets of three-dimensional coordinates in the device-world coordinate system for the virtual object (e.g., a set of three-dimensional coordinates in the device-world coordinate system for each vertex of the virtual object). The device 103 transforms the one or more sets of three-dimensional coordinates in the device-world coordinate system into one or more sets of two-dimensional coordinates in the display coordinate system using a transform based on the pose of the perspective. Finally, the device 103 renders the virtual object on the display 104 using the two-dimensional coordinates in the display coordinate system.

In various implementations, a device-world-locked virtual object, in response to movement of the device 103, maintains its location on the display 104. In various implementations, a device-world-locked virtual object, in response to movement of the device 103, changes its location on the display 104 to maintain its appearance at the same location in the virtual room 160. For example, if the virtual room 160 is displayed with a parallel projection or a fixed perspective, a device-world-locked virtual object maintains its location on the display 104 in response to movement of the device 103. However, if the virtual room 160 is displayed with a dynamic perspective (e.g., based on a perspective of a user with respect to the device 103), a device-world-locked virtual object may change its location on the display 104 in response to movement of the device 103 with respect to the perspective of the user to maintain its appearance at the same location in the virtual room 160.

In various implementations, the location in the virtual room 160 of a device-world-locked virtual object changes over time. Accordingly, the location on the display 104 of the device-world-locked virtual object correspondingly changes over time to appear at the changed location in the virtual room 160. For example, in FIG. 1A, the virtual cat 162 is displayed at a location on the display 104 corresponding to a first cat location in the virtual room 160 and, in FIG. 1B, the virtual cat 162 is displayed at a location on the display 104 corresponding to a second cat location in the virtual room 160.

Throughout FIGS. 1A-1N, the device 103 changes location (and orientation) in the physical environment 100. Accordingly, various virtual objects change their corresponding locations on the display 104 accordingly to the reference frame in which the virtual objects are locked. In FIGS. 1A-1N, the virtual rug 161 is device-world-locked and does not change its location in the virtual room 160. In FIGS. 1A-1N, the virtual cat 162 transitions from device-world-locked to physical-world-locked and back to device-world-locked. Further, while device-world-locked, the virtual cat 162 changes its location in the virtual room 160 and, while physical-world-locked, the virtual cat 162 changes its location in the physical environment 100. In FIGS. 1A-1N, the virtual window 163 is device-world-locked and does not change its location in the virtual room 160. In FIGS. 1A-1H, the virtual ice cream 164 is physical-world-locked and does not change its location in the physical environment. In FIG. 1I-1N, the virtual ice cream 164 is not displayed. In FIGS. 1A-1N, the virtual close button 165 is display-locked and does not change its location on the display 104.

FIG. 1A illustrates the physical environment 100 at a first time. At the first time, the device 103 is at a first location in the physical environment 100. At the first time, the virtual rug 161 is at a rug location in the virtual room 160 and is displayed at a location on the display 104 corresponding to the rug location in the virtual room 160. The virtual cat 162 is at a first cat location in the virtual room 160 and is displayed at a location on the display 104 corresponding to the first cat location in the virtual room 160. The virtual window 163 is at a window location in the virtual room 160 and is displayed at a location on the display 104 corresponding to the window location in the virtual room 160. The virtual ice cream 164 is at a location in the physical environment 100 within the physical bowl 102 and is displayed at a location on the display 104 corresponding to the location in the physical environment 100 within the physical bowl 102. The virtual close button 165 is at location on the display 104 and is displayed at the location on the display 104.

FIG. 1B illustrates the physical environment 100 at a second time subsequent to the first time. At the second time, the device 103 has maintained its location at the first location in the physical environment 100. At the second time, the virtual rug 161, the virtual window 163, the virtual ice cream 164, and the virtual close button 165 have maintained their locations in their respective reference frames and their respective locations on the display 104 as compared to FIG. 1A. The virtual cat 162 has moved from the first cat location in the virtual room 160 to a second cat location in the virtual room 160 atop the virtual rug 161. Accordingly, the virtual cat 162 is displayed at a location on the display 104 corresponding to the second cat location in the virtual room 160 which is different than the location on the display of the virtual cat 162 in FIG. 1A.

FIG. 1C illustrates the physical environment 100 at a third time subsequent to the second time. At the third time, the device 103 has moved its location from the first location in the physical environment 100 to a second location in the physical environment 100. Further, although the location and orientation of the device 103 has changed, in FIG. 1C, the perspective at which the virtual room 160 is displayed remains unchanged. In various implementations, the perspective remains unchanged because the virtual room 160 is displayed with a fixed perspective (or a parallel projection). In various implementations, the perspective remains unchanged because the perspective of the user correspondingly moves with the device 103 and does not move with respect to the device 103.

At the third time, the virtual rug 161, the virtual cat 162, the virtual window 163, the virtual ice cream 164, and the virtual close button 165 have maintained their locations in their respective reference frames. Accordingly, as device-world-locked objects, the virtual rug 161, the virtual cat 162, and the virtual window 163 have maintained their locations on the display 104 as compared to FIG. 1B. Similarly, as a display-locked object, the virtual close button 165 has maintained its location on the display 104 as compared to FIG. 1B. However, as a physical-world-locked object, the virtual ice cream 164 has changed its location on the display such that it appears to maintain its location in the physical environment 100 within the physical bowl 102.

FIG. 1D illustrates the physical environment 100 at a fourth time subsequent to the third time. Between the third time and the fourth time, the device 103 detected a transition trigger which causes the virtual cat 102 to initiate a transition from being a device-world-locked virtual object to a physical-world-locked virtual object. In various implementations, the transition trigger includes detection of an object in the image of the physical environment 100, e.g., detecting the physical bowl 102 in which the virtual ice cream 164 is displayed. In various implementations, the transition trigger includes a user input, such as tapping the display 104 at the location of the virtual window 163 to cause the virtual window 163 to be displayed in an open state rather than a closed state. In various implementations, the transition trigger includes determining that virtual cat 162 is less than a threshold distance, in the device-world coordinate system, from the virtual window 163. Various other device-world-to-physical-world triggers are possible.

At the fourth time, the device 103 has maintained its location at the second location in the physical environment 100. At the fourth time, the virtual rug 161, the virtual window 163, the virtual ice cream 164, and the virtual close button 165 have maintained their locations in their respective reference frames and their respective locations on the display 104 as compared to FIG. 1C. The virtual cat 162 has moved from the second cat location in the virtual room 160 to a third cat location in the virtual room 160 proximate to the virtual window 163. Accordingly, the virtual cat 162 is displayed at a location on the display 104 corresponding to the third cat location in the virtual room 160 which is different than the location on the display 104 of the virtual cat 162 in FIG. 1C.

FIG. 1E illustrates the physical environment 100 at a fifth time subsequent to the fourth time. At the fifth time, the device 103 has maintained its location at the second location in the physical environment 100. At the fifth time, the virtual rug 161, the virtual window 163, the virtual ice cream 164, and the virtual close button 165 have maintained their locations in their respective reference frames and their respective locations on the display 104 as compared to FIG. 1D. The virtual cat 162 has moved from the third cat location in the virtual room 160 to a device-world-to-physical-world transition location within the virtual window 163 partially within the virtual room 160 and partially in the physical environment 100. Accordingly, the virtual cat 162 is displayed at a location on the display 104 corresponding to the device-world-to-physical-world transition location which is different than the location on the display 104 of the virtual cat 162 in FIG. 1D.

At the moment of transition between being a device-world-locked virtual object and a physical-world-locked virtual object, the location on the display 104 of the virtual cat 162 does not change. Thus, at the moment of device-world-to-physical-world transition, the location of the virtual cat 162 in the device-world coordinate system corresponds to the same location on the display 104 as the location of the virtual cat 162 in the physical-world coordinate system.

Thus, at the moment of transition, the location in the physical-world coordinate system of the virtual cat 162 can be determined, as follows: the one or more sets of three-dimensional coordinates in the device-world coordinate system are transformed into one or more sets of two-dimensional coordinates in the display coordinate system using a transform based on the pose of the perspective. The one or more sets of two-dimensional coordinates in the display coordinate system are transformed into one or more sets of three-dimensional coordinates in the camera coordinate system using a transform based on the intrinsic parameters of the camera. The one or more sets of three-dimensional coordinates in the camera coordinate system are transformed into one or more sets of three-dimensional coordinates in the physical-world coordinate system using a transform based on the pose of the device 103.

The transformation from the display coordinate system to the camera coordinate system is underdetermined. Accordingly, in various implementations, additional information is used to perform the transform, such as a depth map of the virtual object, a scaling between the device-world coordinate system and the physical-world coordinate system, a preferred location in the physical-world coordinate system (e.g., closest to the virtual ice cream 164), or other information.

In various implementations, the virtual cat 162 is a device-world-locked virtual object until the virtual cat 162 is completely through the virtual window 163 at which point it transitions to being a physical-world-locked virtual object. In various implementations, the virtual cat 162 is a physical-world-locked virtual object as soon as the virtual cat 162 contacts the virtual window 163. In various implementations, the virtual cat 162 transitions from being a device-world-locked virtual object to a physical-world-locked virtual object when the virtual cat 162 is at least a threshold amount (e.g., 50%) through the virtual window 163.

FIG. 1F illustrates the physical environment 100 at a sixth time subsequent to the fifth time. At the sixth time, the device 103 has maintained its location at the second location in the physical environment 100. At the sixth time, the virtual rug 161, the virtual window 163, the virtual ice cream 164, and the virtual close button 165 have maintained their locations in their respective reference frames and their respective locations on the display 104 as compared to FIG. 1E. The virtual cat 162 has moved from the device-world-to-physical-world transition location to a first cat location in the physical environment 100. Accordingly, the virtual cat 162 is displayed at a location on the display 104 corresponding to the first cat location in the physical environment which is different than the location on the display 104 of the virtual cat 162 in FIG. 1E.

FIG. 1G illustrates the physical environment 100 at a seventh time subsequent to the sixth time. At the seventh time, the device 103 has moved its location from the second location in the physical environment 100 to a third location in the physical environment 100. Further, although the location and orientation of the device 103 has changed, in FIG. 1G, the perspective at which the virtual room 160 is displayed remains unchanged.

At the sixth time, the virtual rug 161, the virtual cat 162, the virtual window 163, the virtual ice cream 164, and the virtual close button 165 have maintained their locations in their respective reference frames. Accordingly, as device-world-locked objects, the virtual rug 161 and the virtual window 163 have maintained their locations on the display 104 as compared to FIG. 1G. Similarly, as a display-locked object, the virtual close button 165 has maintained its location on the display 104 as compared to FIG. 1G. However, as a physical-world-locked object, the virtual ice cream 164 has changed its location on the display 104 such that it appears to maintain its location in the physical environment 100 within the physical bowl 102. Further, as a physical-world-locked object, the virtual cat 162 has changed its location on the display 104 such that it appears to maintain the first cat location in the physical environment 100.

FIG. 1H illustrates the physical environment 100 at an eighth time subsequent to the seventh time. At the eighth time, the device 103 has maintained its location at the third location in the physical environment 100. At the eighth time, the virtual rug 161, the virtual window 163, the virtual ice cream 164, and the virtual close button 165 have maintained their locations in their respective reference frames and their respective locations on the display 104 as compared to FIG. 1G. The virtual cat 162 has moved from the first cat location in the physical environment 100 to a second cat location in the physical environment 100 closer to the physical bowl 102 (and the virtual ice cream 164). Accordingly, the virtual cat 162 is displayed at a location on the display 104 corresponding to the second cat location in the physical environment 100 which is different than the location on the display 104 of the virtual cat 162 in FIG. 1G.

FIG. 1I illustrates the physical environment 100 at a ninth time subsequent to the eighth time. Between the eighth time and the ninth time, the device 103 detected a transition trigger which causes the virtual cat 102 to initiate a transition from being a physical-world-locked virtual object to a device-world-locked virtual object. In various implementations, the transition trigger includes determining that the virtual cat 162 has completed an objective, e.g., eating the virtual ice cream 164 (which is no longer displayed).

At the ninth time, the device 103 has maintained its location at the third location in the physical environment 100. At the ninth time, the virtual rug 161, the virtual window 163, and the virtual close button 165 have maintained their locations in their respective reference frames and their respective locations on the display 104 as compared to FIG. 1H. The virtual cat 162 has moved from the second cat location in the physical environment 100 to a third cat location in the physical environment 100. Accordingly, the virtual cat 162 is displayed at a location on the display 104 corresponding to the third cat location in the physical environment which is different than the location on the display 104 of the virtual cat 162 in FIG. 1H.

FIG. 1J illustrates the physical environment 100 at a tenth time subsequent to the ninth time. At the tenth time, the device 103 has maintained its location at the third location in the physical environment 100. At the tenth time, the virtual rug 161, the virtual window 163, the virtual ice cream 164, and the virtual close button 165 have maintained their locations in their respective reference frames and their respective locations on the display 104 as compared to FIG. 1I. The virtual cat 162 has moved from the third cat location in the physical environment 100 to a physical-world-to-device-world transition location within the virtual window 163 partially within the virtual room 160 and partially in the physical environment 100. Accordingly, the virtual cat 162 is displayed at a location on the display 104 corresponding to the physical-world-to-device-world transition location which is different than the location on the display 104 of the virtual cat 162 in FIG. 1I.

At the moment of transition between being a physical-world-locked virtual object and a device-world-locked virtual object, the location on the display 104 of the virtual cat 162 does not change. Thus, at the moment of physical-world-to-device-world transition, the location of the virtual cat 162 in the physical-world coordinate system corresponds to the same location on the display 104 as the location of the virtual cat 162 in the device-world coordinate system.

Thus, at the moment of transition, the location in the device-world coordinate system of the virtual cat 162 can be determined, as follows: the one or more sets of three-dimensional coordinates in the physical-world coordinate system are transformed into one or more sets of three-dimensional coordinates in the camera coordinate system using a transform based on the pose of the device 103. The one or more sets of three-dimensional coordinates in the camera coordinate system are transformed into one or more sets of two-dimensional coordinates in the display coordinate system using a transform based on the intrinsic parameters of the camera. The one or more sets of two-dimensional coordinates in the display coordinate system are transformed into one or more sets of three-dimensional coordinates in the device-world coordinate system using a transform based on the pose of the perspective.

The transformation from the display coordinate system to the device-world coordinate system is underdetermined. Accordingly, in various implementations, additional information is used to perform the transform, such as such as a depth map of the virtual object, a scaling between the device-world coordinate system and the physical-world coordinate system, a preferred location in the physical-world coordinate system (e.g., closest to the virtual window 163), or other information.

In various implementations, the virtual cat 162 is a physical-world-locked virtual object until the virtual cat 162 is completely through the virtual window 163 at which point it transitions to being a device-world-locked virtual object. In various implementations, the virtual cat 162 is a device-world-locked virtual object as soon as the virtual cat 162 contacts the virtual window 163. In various implementations, the virtual cat 162 transitions from being a physical-world-locked virtual object to a device-world-locked virtual object when the virtual cat 162 is at least a threshold amount (e.g., 50%) through the virtual window 163.

FIG. 1K illustrates the physical environment 100 at an eleventh time subsequent to the tenth time. At the eleventh time, the device 103 has maintained its location at the third location in the physical environment 100. At the eleventh time, the virtual rug 161, the virtual window 163, and the virtual close button 165 have maintained their locations in their respective reference frames and their respective locations on the display 104 as compared to FIG. 1J. The virtual cat 162 has moved from the physical-world-to-device-world transition location to a fourth cat location in the virtual room 160. Accordingly, the virtual cat 162 is displayed at a location on the display 104 corresponding to the fourth cat location in the virtual room 160 which is different than the location on the display 104 of the virtual cat 162 in FIG. 1J.

FIG. 1L illustrates the physical environment 100 at a twelfth time subsequent to the eleventh time. At the twelfth time, the device 103 has moved its location from the third location in the physical environment 100 back to the first location in the physical environment 100. Further, although the location and orientation of the device 103 has changed, in FIG. 1L, the perspective at which the virtual room 160 is displayed remains unchanged.

At the twelfth time, the virtual rug 161, the virtual cat 162, the virtual window 163, and the virtual close button 165 have maintained their locations in their respective reference frames. Accordingly, as device-world-locked objects, the virtual rug 161 and the virtual window 163 have maintained their locations on the display 104 as compared to FIG. 1K. As another device-world-locked object, the virtual cat 162 has maintained its location on the display 104 as compared to FIG. 1K. Similarly, as a display-locked object, the virtual close button 165 has maintained its location on the display 104 as compared to FIG. 1K.

FIG. 1M illustrates the physical environment 100 at a thirteenth time subsequent to the twelfth time. At the thirteenth time, the device 103 has maintained its location at the third location in the physical environment 100, but changed its orientation. Thus, in various implementations, the perspective at which the virtual room 160 is displayed is changed.

At the thirteenth time, the virtual rug 161, the virtual cat 162, the virtual window 163, and the virtual close button 165 have maintained their locations in their respective reference frames. Accordingly, as device-world-locked objects, the virtual rug 161 and the virtual window 163 have maintained their locations in the virtual room 160, but changed their locations on the display 104 as compared to FIG. 1M due to the change in perspective. As a display-locked object, the virtual close button 165 has maintained its location on the display 104 as compared to FIG. 1M even with the change in perspective.

FIG. 1N illustrates the physical environment 100 at a fourteenth time subsequent to the thirteenth time. At the fourteenth time, the device 103 has maintained its location at the first location in the physical environment 100 and maintained its orientation. At the fourteenth time, the virtual rug 161, the virtual window 163, and the virtual close button 165 have maintained their locations in their respective reference frames and their respective locations on the display 104 as compared to FIG. 1M. The virtual cat 162 has moved from the fourth cat location in the virtual room 160 to the second cat location in the virtual room 160 atop the virtual rug 161. Accordingly, the virtual cat 162 is displayed at a location on the display 104 corresponding to the second cat location in the virtual room 160 which is different than the location on the display 104 of the virtual cat 162 in FIG. 1M (and different than the location on the display 104 of the virtual cat 162 in FIG. 1B due to the change in perspective as compared to FIG. 1B).

Figure 2:
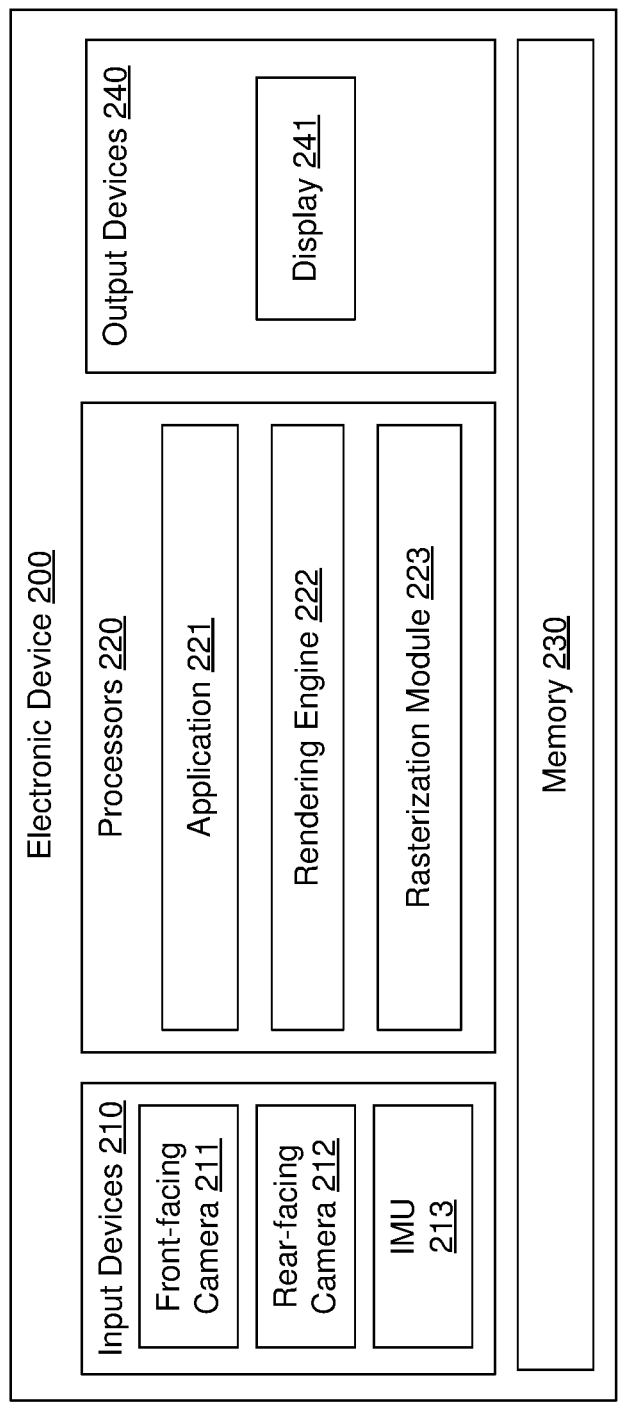
FIG. 2 illustrates a block diagram of an electronic device in accordance with some implementations.

FIG. 2 illustrates a functional block diagram of an electronic device 200 in accordance with some implementations.

The electronic device 200 includes one or more input devices 210, one or more processors 220, memory 230, and one or more output devices 240. The output devices 240 include a display 241. In various implementations, the electronic device 200 includes additional output devices 240, such as a speaker or vibrator for haptic feedback.

The input devices 210 include a front-facing camera 211 on the same side of the electronic device 200 as the display 241. In various implementations, the front-facing camera 211 captures images of a user. From the images of the user, a perspective of the user can be determined using face-tracking and/or eye-tracking. The input devices 210 include a rear-facing camera 212 on the opposite side of the electronic device 200 as the display 241. In various implementations, the rear-facing camera 212 captures images of a portion of a physical environment. The input devices 210 include an inertial measurement unit (IMU) 213. In various implementations, data from the inertial measurement unit 213 is used to determine the pose of the electronic device 200 (and, in particular, the rear-facing camera 212) in a three-dimensional physical-world coordinate system. In various implementations, the electronic device 200 includes additional input devices 210 such as a touchscreen interface, a mouse, a keyboard, or a microphone.

The processors 220 execute an application 221. The application 221 generates sets of coordinates in various coordinate systems for different virtual objects. In various implementations, the coordinates are based on object models for the virtual objects. In various implementations, the coordinates are based on user input received via the input devices 210. For physical-world-locked virtual objects, such as the virtual ice cream 164 of FIGS. 1A-1N, the application 221 generates one or more sets of three-dimensional coordinates in the physical-world coordinate system. For device-world-locked virtual objects, such as the virtual rug 161 of FIGS. 1A-1N, the application 221 generates one or more sets of three-dimensional coordinates in the device-world coordinate system. For display-locked virtual objects, such as the virtual close button 165, the application 221 generates one or more sets of two-dimensional coordinates in the display coordinate system.

The application 221 provides the coordinates to the rendering engine 222. In various implementations, the coordinates are vertices of the object and, in addition to the coordinates, the application provides triangle information of triangles formed by the vertices.

The rendering engine converts the coordinates into two-dimensional coordinates in the display coordinate system. For physical-world-locked objects, the rendering engine 222 converts three-dimensional coordinates in the physical-world coordinate system into three-dimensional coordinates in the camera coordinate system (using a transform based on the pose of the electronic device 200 derived from information from the IMU 213) and converts the three-dimensional coordinates in the camera coordinate system into two-dimensional coordinate in the display coordinate system (using a transform based on intrinsic parameters of the rear-facing camera 212 stored in the memory 230).

For device-world-locked objects, the rendering engine 222 converts three-dimensional coordinates in the device-world coordinate system into two-dimensional coordinates in the display coordinate system (using a transform based on the pose of the perspective, which may be fixed or derived from information from the front-facing camera 211).

For display-locked objects, the rendering engine 222 receives two-dimensional coordinates in the display coordinate system and needs not transform them.

In various implementations, the coordinates are transmitted from the application to the rendering engine with an indication of the reference frame. For example, for a physical-world-locked virtual object, the application 221 transmits a world indicator having a first value indicating that the associated coordinates are three-dimensional coordinates in the physical-world coordinate system. As another example, for a device-world-locked virtual object, the application 221 transmits a world indicator having a second value indicating that the associated coordinates are three-dimensional coordinates in the device-world coordinate system. As another example, for a display-locked virtual object, the application 221 transmits a world indicator having a third value indicating that the associated coordinates are two-dimensional coordinates in the display coordinate system.

The rendering engine 222 provides the two-dimensional coordinates (and other primitive information) to the rasterization module 223. The rasterization module 223, which may be a graphic processing unit (GPU), generates pixel values for each pixel of the display 241 based on the primitive information. The rasterization module 223 provides the pixel values to the display 241 which displays an image comprising pixels having the pixel values.

In various implementations, information is fed back from the rendering engine 222 to the application 221. For example, in various implementations, the application 221 transmits, for a device-world-locked object, one or more sets of three-dimensional coordinates in the device-world coordinate system, a world indicator indicating that the associated coordinates are three-dimensional coordinates in the device-world coordinate system, and a transition request for the corresponding three-dimensional coordinates in the physical-world coordinate system (having the same two-dimensional coordinates in the display coordinate system). Upon receiving the transition request, the rendering engine 222 determines the two-dimensional coordinates in the display coordinate system to provide to the rasterization module 223 and, based on the two-dimensional coordinates in the display coordinate system, determines corresponding three-dimensional coordinates in the physical-world coordinate system to provide back to the application 221.

As another example, in various implementations, the application 221 transmits, for a physical-world-locked object, one or more sets of three-dimensional coordinates in the physical-world coordinate system, a world indicator indicating that the associated coordinates are three-dimensional coordinates in the physical-world coordinate system, and a transition request for the corresponding three-dimensional coordinates in the device-world coordinate system (having the same two-dimensional coordinates in the display coordinate system). Upon receiving the transition request, the rendering engine 222 determines the two-dimensional coordinates in the display coordinate system to provide to the rasterization module 223 and, based on the two-dimensional coordinates in the display coordinate system, determines corresponding three-dimensional coordinates in the device-world coordinate system to provide back to the application 221.

Figure 3:
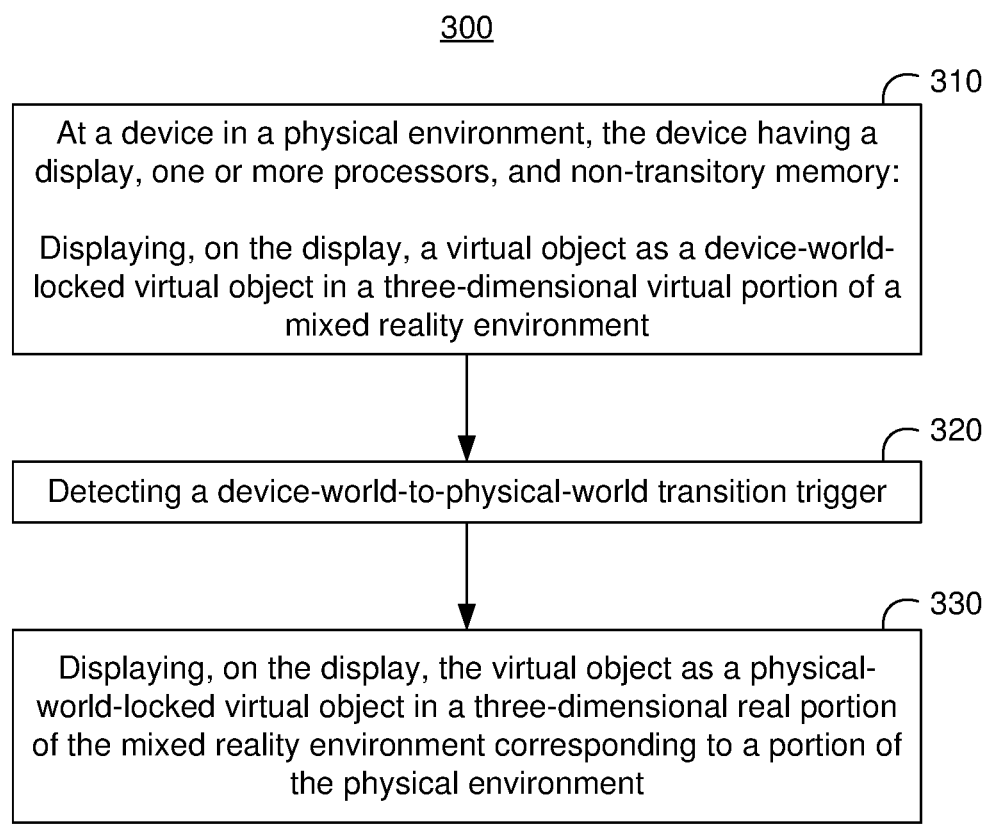
FIG. 3 illustrates a flowchart representation of a method of displaying a virtual object in accordance with some implementations.

FIG. 3 is a flowchart representation of a method 300 of displaying a virtual object in accordance with some implementations. In various implementations, the method 300 is performed by a device in a physical environment. In various implementations, the method 300 is performed by a device including a display, one or more processors, and non-transitory memory. In some implementations, the method 300 is performed by processing logic, including hardware, firmware, software, or a combination thereof. In some implementations, the method 300 is performed by a processor executing instructions (e.g., code) stored in a non-transitory computer-readable medium (e.g., a memory).

The method 300 begins, in block 310, with the device displaying, on the display, a virtual object as a device-world-locked virtual object in a three-dimensional virtual portion of a mixed reality environment. For example, in FIG. 1A, the device 103 displays, on the display 104, the virtual cat 162 as a device-world-locked virtual object in the virtual room 160 of the MR environment 150.

The method 300 continues, in block 320, with the device detecting a device-world-to-physical-world transition trigger. For example, in FIG. 1D, the device 103 has detected a device-world-to-physical-world transition trigger. In various implementations, detecting the device-world-to-physical-world transition trigger includes detecting a physical object in an image of the physical environment. In various implementations, detecting the device-world-to-physical-world transition trigger includes detecting that the virtual object is less than a threshold distance from another virtual object. In various implementations, detecting the device-world-to-physical-world transition trigger includes detecting a user input, which may include a facial expression of a user or a vocal command spoken by the user.

The method 300 continues, in block 330, with the device, in response to detecting the device-world-to-physical-world transition trigger, displaying, on the display, the virtual object as a physical-world-locked virtual object in a real portion of the mixed reality environment corresponding to at least a portion of the physical environment. For example, in FIG. 1G, the device 103 displays, on the display 104, the virtual cat 162 as a physical-world-locked virtual object in the physical environment representation 170 of the MR environment 150 that corresponds to a portion of the physical environment 100. In various implementations, the three-dimensional real portion is based on an image of the physical environment captured using a rear-facing camera of the device on the opposite side of the device as the display and directed towards the portion of the physical environment.

Thus, in various implementations, the method 300 includes displaying, on the display, a mixed reality environment including a three-dimensional virtual portion and a three-dimensional real portion corresponding to at least a portion of the physical environment. For example, in FIG. 1A, the MR environment 150 includes the virtual room 160 and the physical environment representation 170. In various implementations, the virtual portion and the real portion are separated by a two-dimensional portal. For example, in FIG. 1A, the virtual room 160 and the physical environment representation 170 are separated by the virtual window 163.

In various implementations, prior to displaying the mixed reality environment including the virtual portion and the real portion, the device displays a virtual environment including the virtual portion. For example, in various implementations, the virtual portion includes a virtual door. When the virtual door is closed, the device displays a virtual environment including the virtual portion. When the virtual door is opened, the device displays a mixed reality environment including the virtual portion and, through the resulting virtual doorway, the real portion. Thus, the virtual doorway is a two-dimensional portal separating the virtual portion and the real portion.

The physical environment is associated with a three-dimensional physical-world coordinate system in which a point in the physical-world coordinate system includes an x-coordinate, a y-coordinate, and a x-coordinate. The rear-facing camera is associated with a three-dimensional camera coordinate system in which a point in the camera coordinate system includes an i-coordinate, a j-coordinate, and a k-coordinate. The k-axis of the camera coordinate system corresponding to the optical axis of the camera. The physical-world coordinate system and the camera coordinate system are related by a transform based on the pose (e.g., the three-dimensional location and three-dimensional orientation) of the rear-facing camera (and the device) in the physical-world coordinate system. Thus, when the three-dimensional coordinates of a point in the physical-world coordinate system and the pose of the device in the physical-world coordinate system are known, the three-dimensional coordinates of the point in the camera coordinate system can be determined.

Further, the display is associated with a two-dimensional display coordinate system in which a point in the display coordinate system includes a u-coordinate and a v-coordinate. The camera coordinate system and the display coordinate system are related by a transform based on the intrinsic parameters of the camera. Thus, when the three-dimensional coordinates of a point in the camera coordinate system and the intrinsic parameters of the camera are known, the two-dimensional coordinates of the point in the display coordinate system can be determined.

The virtual portion of the mixed reality environment is associated with a three-dimensional device-world coordinate system in which a point in the device-world coordinate system includes an X-coordinate, a Y-coordinate, and a Z-coordinate. The device-world coordinate system and the display coordinate system are related by a transform based on the pose of the perspective (sometimes referred to as the "virtual camera") in the device-world coordinate system, e.g., the location and orientation at which the virtual portion is being viewed. Thus, when the three-dimensional coordinates of a point in the device-world coordinate system and the pose of the perspective are known, the two-dimensional coordinates of the point in the display coordinate system can be determined.

In various implementations, displaying the virtual object as a device-world-locked virtual object includes determining a location in the virtual portion of the virtual object. In various implementations, determining the location in the virtual portion of the virtual object includes determining one or more sets of three-dimensional coordinates in the device-world coordinate system of (one or more vertices of) the virtual object.

In various implementations, displaying the virtual object as a device-world-locked virtual object includes determining a location on the display of the virtual object corresponding to the location in the virtual portion of the virtual object. In various implementations, determining the location on the display of the virtual object corresponding to the location in the virtual portion of the virtual object includes determining one or more sets of two-dimensional coordinates in the display coordinate system of the virtual object corresponding to the one or more sets of three-dimensional coordinates in the device-world three-dimensional coordinate system of the virtual object.

In various implementations, determining the one or more sets of two-dimensional coordinates in the display coordinate system of the virtual object corresponding to the one or more sets of three-dimensional coordinates in the device-world coordinate system of the virtual object includes transforming the one or more sets of three-dimensional coordinates in the device-world coordinate system using a transform (e.g., a projection transform) based on a pose of a perspective in the device-world coordinate system.

In various implementations, the pose of the perspective is fixed. For example, in various implementations, the pose of the perspective is fixed at a location a perpendicular distance (e.g., eighteen inches) away from the center of the display, looking at the center of the display. In various implementations, the pose of the perspective is dynamic, e.g., based on a perspective of a user with respect to the device.

In various implementations, displaying the virtual object as a device-world-locked virtual object includes displaying, on the display, the virtual object at the location on the display of the virtual object corresponding to the location in the virtual portion of the virtual object. In various implementations, displaying the virtual object at the location of the display of the virtual object corresponding to the location in the virtual portion of the virtual object includes displaying, on the display, the virtual object at the one or more sets of two-dimensional coordinates in the display coordinate system of the virtual object corresponding to the one or more sets of three-dimensional coordinates in the device-world coordinate system of the virtual object.

In various implementations, displaying the virtual object as a physical-world-locked virtual object includes determining a location in the physical environment of the virtual object. In various implementations, determining the location in the physical environment of the virtual object includes determining one or more sets of three-dimensional coordinates in the physical-world coordinate system of the virtual object.

In various implementations, displaying the virtual object as a physical-world-locked virtual object includes determining a location on the display of the virtual object corresponding to the location in the physical environment of the virtual object. In various implementations, determining the location on the display of the virtual object corresponding to the location in the physical environment of the virtual object includes determining one or more sets of two-dimensional coordinates in the display coordinate system of the virtual object corresponding to the one or more sets of three-dimensional coordinates in the physical-world coordinate system of the virtual object.

In various implementations, determining the one or more sets of two-dimensional coordinates in the display coordinate system of the virtual object corresponding to the one or more sets of three-dimensional coordinates in the physical-world coordinate system of the virtual object includes transforming the one or more sets of three-dimensional coordinates in the physical-world coordinate system of the virtual object using a transform based on the pose of the device (and, in various implementations, intrinsic parameters of the rear-facing camera).

In various implementations, displaying the virtual object as a physical-world-locked virtual object includes displaying, on the display, the virtual object at the location on the display of the virtual object corresponding to the location in the physical environment of the virtual object. In various implementations, displaying the virtual object at the location of the display of the virtual object corresponding to the location in the physical environment of the virtual object includes displaying, on the display, the virtual object at the one or more sets of two-dimensional coordinates in the display coordinate system of the virtual object corresponding to the one or more sets of three-dimensional coordinates in the physical-world coordinate system of the virtual object.

Thus, while displayed as a physical-world-locked virtual object, the location on the display of the virtual object is determined based on one or more sets of three-dimensional coordinates in the physical-world coordinate system. Also, in various implementations, while displayed as a physical-world-locked virtual object, the location on the display of the virtual object is determined using a transform based on a pose of a device. Conversely, in various implementations, while displayed as a device-world-locked virtual object, the location on the display of the virtual object is determined based on one or more sets of three-dimensional coordinates in the device-world coordinate system and not based on one or more sets of three-dimensional coordinates in the physical-world coordinate system. Also, in various implementations, while displayed as a device-world-locked virtual object, the location on the display of the virtual object is determined using a transform based on a pose of a perspective and not using a transform based on a pose of the device.

In various implementations, the virtual object smoothly transitions from being displayed as a device-world-locked virtual object to a physical-world-locked virtual object. For example, in various implementations, the virtual object is displayed during a transition time period, which may be two frames, as a device-world-locked virtual object at a device-world-to-physical-world transition location on the display and, subsequently, as a physical-world-locked virtual object at substantially the same device-world-to-physical-world transition location on the display. For example, in FIG. 1E, the virtual cat 162 is display at a location on the display corresponding to a device-world-to-physical-world transition location within the virtual window 163 partially within the virtual room 160 and partially in the physical environment 100. In various implementations, the virtual cat 162 is displayed as a device-world-locked virtual object at a device-world-to-physical-world transition location on the display corresponding to a device-world-to-physical-world transition location in the virtual room 160 and subsequently, as a physical-world-locked object at substantially the same device-world-to-physical-world transition location on the display corresponding to a device-world-to-physical-world location in the physical environment 100.

Accordingly, in various implementations, displaying the virtual object as a device-world-locked virtual object includes displaying the virtual object at a device-world-to-physical-world transition location on the display corresponding to a device-world-to-physical-world location in the virtual portion of the virtual object and displaying the virtual object as a physical-world-locked virtual object includes displaying the virtual object substantially at the device-world-to-physical-world transition location on the display corresponding to a device-world-to-physical-world location in the physical environment of the virtual object. In various implementations, displaying the virtual object substantially at the device-world-to-physical-world transition location is performed one frame period after displaying the virtual object at the device-world-to-physical-world transition location.

In various implementations, the virtual object transitions from being displayed as device-world-locked to physical-world-locked in response to the virtual object contacting the two-dimensional portal. Thus, in various implementations, displaying the virtual object substantially at the device-world-to-physical-world transition location is performed in response to the virtual object contacting a two-dimensional portal separating the virtual portion from the real portion. In various implementations, the virtual object transitions from being displayed as device-world-locked to physical-world-locked in response to the virtual object completely passing through (and ceasing contact with) the two-dimensional portal. Thus, in various implementations, displaying the virtual object substantially at the device-world-to-physicalworld transition location is performed in response to the virtual object completely passing through a two-dimensional portal separating the virtual portion from the real portion. In various implementations, the virtual object transitions from being displayed as device-world-locked to physical-world-locked in response to at least a threshold portion of the virtual object passing through the two-dimensional portal. Thus, in various implementations, displaying the virtual object substantially at the device-world-to-physical-world transition location is performed in response to at least a threshold portion of the virtual object passing through a two-dimensional portal separating the virtual portion from the real portion.

In various implementations, the method 300 includes determining the device-world-to-physical-world transition location in the physical environment of the virtual object. In various implementations, the device-world-to-physical-world transition location in the physical environment of the virtual object is based on the device-world-to-physical-world location on the display, intrinsic parameters of the rear-facing camera, the pose of the device, and/or a depth map of the virtual object.

In various implementations, the location in the virtual portion of the virtual object changes over time. Thus, in various implementations, displaying the virtual object as a device-world-locked virtual object includes displaying the virtual object at a first location on the display associated with a first location in the virtual portion and, subsequently, displaying the virtual object at a second location on the display associated with a second location in the virtual portion. For example, in FIG. 1A, the device 103 displays the virtual cat 162 at a first location on the display 104 corresponding to the first cat location in the virtual room 160. Subsequently, in FIG. 1B, without movement of the device 103 in the physical environment 100, the device 103 displays the virtual cat 162 at a second location on the display 104 corresponding to the second cat location in the virtual room 160.

Similarly, in various implementations, the location in the physical environment of the virtual object changes over time. Thus, in various implementations, displaying the virtual object as a physical-world-locked virtual object includes displaying the virtual object at a first location on the display associated with a first location in the physical environment and, subsequently, displaying the virtual object at a second location on the display associated with a second location in the physical environment. For example, in FIG. 1G, the device 103 displays the virtual cat 162 at a first location on the display 104 corresponding to the first cat location in the physical environment 100. Subsequently, in FIG. 1H, without movement of the device 103 in the physical environment 100, the device 103 displays the virtual cat 162 at a second location on the display 104 corresponding to the second cat location in the physical environment.

In various implementations, the device represents the virtual object in memory using one or more sets of three-dimensional coordinates stored in association with a world indicator that indicates whether the one or more sets of three-dimensional coordinates are coordinates in the device-world coordinate system or the physical-world coordinate system. Based on the set of one or more three-dimensional coordinates and the world indicator, the device determines the location on the display to display the virtual object.

Thus, in various implementations, displaying the virtual object as a device-world-locked object includes associating one or more sets of three-dimensional coordinates in a device-world coordinate system of the virtual object with a world indicator having a first value (indicating that the three-dimensional coordinates are in the device-world coordinate system) and displaying the virtual object as a physical-world-locked object includes associating one or more sets of three-dimensional coordinates in a physical-world coordinate system of the virtual object with a world indicator having a second value different than the first value (indicating that the three-dimensional coordinates are in the device-world coordinate system).

In various implementations, the three-dimensional coordinates in the device-world coordinate system are independent of the pose of the device. Accordingly, in various implementations, displaying the virtual object as a device-world-locked virtual object includes displaying the virtual object at a location on the display and, in response to detecting movement of the device, maintaining display of the virtual object at the location on the display.

In various implementations, the three-dimensional coordinates in the device-world coordinate system are dependent on the pose of the device. For example, in various implementations, tilting the device causes the virtual object to move in the virtual portion of the mixed reality environment. In various implementations, tilting the left side of the device downward causes the virtual object to move to the left in the virtual portion of the mixed reality environment and, consequently, on the display. Similarly, in various implementations, tilting the right side of the device downward causes the virtual object to move to the right in the virtual portion of the mixed reality environment and, consequently, on the display. As another example, shaking the device causes the virtual object to move in the virtual portion of the mixed reality environment. Accordingly, in various implementations, displaying the virtual object as a device-world-locked virtual object includes displaying the virtual object at a location on the display and, in response to detecting movement of the device, changing the location on the display of the virtual object. Similarly, in various implementations, displaying the virtual object as a physical-world-locked virtual object includes displaying the virtual object at a location on the display and, in response to detecting movement of the device, changing the location on the display of the virtual object.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device in a physical environment having a three-dimensional physical-world coordinate system, the device having a display, one or more processors, and non-transitory memory;
displaying, on the display, a virtual object as a device-world-locked virtual object in a three-dimensional virtual portion of a mixed reality environment, wherein displaying the virtual object as a device-world-locked virtual object includes:
determining a first location of the virtual object in a three-dimensional device-world coordinate system;
while the device has a first position and a first orientation in the three-dimensional physical world coordinate system, displaying, on the display, the virtual object at a second location in a two-dimensional display coordinate system based on the first location; and
in response to motion of the device from the first position and the first orientation in the three-dimensional physical-world coordinate system to a second position and a second orientation in the three-dimensional physical-world coordinate system, maintaining display of the virtual object at the second location;
while displaying the virtual object a device-world-locked virtual object, detecting a device-world-to-physical-world transition trigger; and
in response to detecting the device-world-to-physical-world transition trigger, displaying, on the display, the virtual object as a physical-world-locked virtual object in a three-dimensional real portion of the mixed reality environment corresponding to at least a portion of the physical environment, wherein displaying the virtual object as a physical-world-locked virtual object includes:
determining a third location of the virtual object in the three-dimensional physical world-coordinate system;
while the device has a third position and a third orientation in the three-dimensional physical-world coordinate system, displaying, on the display, the virtual object at a fourth location in the two-dimensional coordinate display coordinate system based on the third location, the third position, and the third orientation; and
in response to motion of the device from the third position and the third orientation in the three-dimensional physical-world coordinate system to a fourth position and a fourth orientation in the three-dimensional physical-world coordinate system, moving display of the virtual object to a fifth location based on the third location, the fourth position, and the fourth orientation.

2. The method of claim 1, further comprising determining the second location in the two-dimensional display coordinate system is based on a pose of a perspective in the device-world coordinate system.

3. The method of claim 2, wherein the pose of the perspective is fixed.

4. The method of claim 2, wherein the pose of the perspective is based on a perspective of a user with respect to the device.

5. The method of claim 1, wherein
displaying the virtual object as a device-world-locked virtual object includes displaying, on the display, the virtual object at a first device-world-to-physical-world transition location in the two-dimensional display coordinate system corresponding to a second device-world-to-physical-world location in the three-dimensional device-world coordinate system and displaying the virtual object as a physical-world-locked virtual object includes displaying, on the display, the virtual object substantially at the first device-world-to-physical-world transition location in the two-dimensional display coordinate system corresponding to a third device-world-to-physical-world transition location in the three-dimensional physical-world coordinate system.

6. The method of claim 5, wherein displaying the virtual object substantially at the first device-world-to-physical-world transition location in the two-dimensional display coordinate system is performed one frame period after displaying the virtual object at the first device-world-to-physical-world transition location in the two-dimensional display coordinate system.

7. The method of claim 5, wherein displaying the virtual object substantially at the first device-world-to-physical-world transition location in the two-dimensional display coordinate system is performed in response to at least a threshold portion of the virtual object passing through a two-dimensional portal separating the virtual portion from the real portion.

8. The method of claim 5, further comprising determining the third device-world-to-physical-world transition location in the three-dimensional physical-world coordinate system.

9. The method of claim 1, wherein displaying the virtual object as a device-world-locked virtual object further includes:
determining a sixth location of the virtual object in the three-dimensional device-world coordinate system;
while the device has the first position and the first orientation in the three-dimensional physical-world coordinate system, displaying, on the display, the virtual object at a seventh location in the two-dimensional display coordinate system based on the sixth location.

10. The method of claim 1, wherein displaying the virtual object as a physical-world-locked virtual object further includes:
determining a sixth location of the virtual object in the three-dimensional physical-world coordinate system;
while the device has the fourth position and the fourth orientation in the three-dimensional physical-world coordinate system, displaying, on the display, the virtual object at a seventh location in the two-dimensional display coordinate system based on the sixth location, the fourth position, and the fourth orientation.

11. The method of claim 1, wherein displaying the virtual object as a device-world-locked object includes associating one or more sets of three-dimensional coordinates in the three-dimensional device-world coordinate system of the virtual object with a world indicator having a first value and displaying the virtual object as a physical-world-locked object includes associating one or more sets of three-dimensional coordinates in the three-dimensional physical-world coordinate system of the virtual object with a world indicator having a second value different than the first value.

12. The method of claim 1, wherein displaying the virtual object as a device-world-locked virtual object is independent of the position and the orientation of the device in the three-dimensional physical-world coordinate system and displaying the virtual object as a physical-world-locked virtual object is dependent on the position and the orientation of the device in the three-dimensional physical-world coordinate system.

13. The method of claim 1, further comprising displaying the mixed reality environment including the three-dimensional virtual portion and the three-dimensional real portion.

14. The method of claim 13, further comprising, before displaying the mixed reality environment, displaying a virtual environment including the three-dimensional virtual portion.

15. The method of claim 14, wherein detecting the device-world-to-physical-world transition trigger includes detecting the virtual object enter the two-dimensional portal.

16. The method of claim 13, wherein displaying the mixed reality environment includes displaying a two-dimensional portal separating the virtual portion and the real portion.

17. The method of claim 1, further comprising:
while displaying the virtual object a physical-world-locked virtual object, detecting a physical-world-to-device-world transition trigger; and
in response to detecting the physical-world-to-device-world transition trigger, displaying the virtual object as a device-world-locked virtual object in the three-dimensional virtual portion.

18. A device in a physical environment having a three-dimensional physical-world coordinate system comprising:
a display;
non-transitory memory; and
one or more processors to:
display, on the display, a virtual object as a device-world-locked virtual object in a three-dimensional virtual portion of a mixed reality environment, wherein the one or more processors are to display the virtual object as a device-world-locked virtual object by:
determining a first location of the virtual object in a three-dimensional device-world coordinate system;
while the device has a first position and a first orientation in the three-dimensional physical world coordinate system, displaying, on the display, the virtual object at the second location in a two-dimensional display coordinate system based on the first location; and
in response to motion of the device from the first position and the first orientation in the three-dimensional physical-world coordinate system to a second position and a second orientation in the three-dimensional physical-world coordinate system, maintaining display of the virtual object at the second location;
while displaying the virtual object a device-world-locked virtual object, detect a device-world-to-physical-world transition trigger; and
in response to detecting the device-world-to-physical-world transition trigger, display, on the display, the virtual object as a physical-world-locked virtual object in a three-dimensional real portion of the mixed reality environment corresponding to at least a portion of the physical environment, wherein the one or more processors are to display the virtual object as a physical-world-locked virtual object by:
determining a third location of the virtual object in the three-dimensional physical world-coordinate system;
while the device has a third position and a third orientation in the three-dimensional physical-world coordinate system, displaying, on the display, the virtual object at a fourth location in the two-dimensional coordinate display coordinate system based on the third location, the third position, and the third orientation; and
in response to motion of the device from the third position and the third orientation in the three-dimensional physical-world coordinate system to a fourth position and a fourth orientation in the three-dimensional physical-world coordinate system, moving display of the virtual object to a fifth location based on the third location, the fourth position, and the fourth orientation.

19. The device of claim 18, wherein the one or more processors are to display the virtual object as a device-world-locked virtual object by displaying, on the display, the virtual object at a first device-world-to-physical-world transition location in the two-dimensional display coordinate system corresponding to a second device-world-to-physical-world location in the three-dimensional device-world coordinate system and are to display the virtual object as a physical-world-locked virtual object by displaying, on the display, the virtual object substantially at the first device-world-to-physical-world transition location in the two-dimensional display coordinate system corresponding to a third device-world-to-physical-world transition location in the three-dimensional physical-world coordinate system.

20. A non-transitory memory storing one or more programs, which, when executed by one or more processors of a device in a physical environment having a three-dimensional physical-world coordinate system including a display, cause the device to:
display, on the display, a virtual object as a device-world-locked virtual object in a three-dimensional virtual portion of a mixed reality environment, wherein the one or more programs cause the device to display the virtual object as a device-world-locked virtual object by:

determining a first location of the virtual object in a three-dimensional device-world coordinate system;

while the device has a first position and a first orientation in the three-dimensional physical world coordinate system, displaying, on the display, the virtual object at the second location in a two-dimensional display coordinate system based on the first location; and in response to motion of the device from the first position and the first orientation in the three-dimensional physical-world coordinate system to a second position and a second orientation in the three-dimensional physical-world coordinate system, maintaining display of the virtual object at the second location;

while displaying the virtual object a device-world-locked virtual object, detect a device-world-to-physical-world transition trigger; and in response to detecting the device-world-to-physical-world transition trigger, display, on the display, the virtual object as a physical-world-locked virtual object in a three-dimensional real portion of the mixed reality environment corresponding to at least a portion of the physical environment, wherein the one or more programs cause the device to display the virtual object as a physical-world-locked virtual object by:

determining a third location of the virtual object in the three-dimensional physical world-coordinate system;

while the device has a third position and a third orientation in the three-dimensional physical-world coordinate system, displaying, on the display, the virtual object at a fourth location in the two-dimensional coordinate display coordinate system based on the third location, the third position, and the third orientation; and in response to motion of the device from the third position and the third orientation in the three-dimensional physical-world coordinate system to a fourth position and a fourth orientation in the three-dimensional physical-world coordinate system, moving display of the virtual object to a fifth location based on the third location, the fourth position, and the fourth orientation.

* * * * *